United States Patent [19]

Donomoto et al.

[11] Patent Number: 4,830,932

[45] Date of Patent: May 16, 1989

[54] HEAT RESISTANT LIGHT ALLOY ARTICLES AND METHOD OF MANUFACTURING SAME

[75] Inventors: Tadashi Donomoto; Atsuo Tanaka; Yoshiaki Tatematsu, all of Toyota, Japan

[73] Assignee: Toyota Jidosha Kabushiki Kaisha, Toyota, Japan

[21] Appl. No.: 206,904

[22] Filed: Jun. 15, 1988

Related U.S. Application Data

[63] Continuation of Ser. No. 87,988, Aug. 17, 1987, abandoned, which is a continuation of Ser. No. 937,457, Dec. 2, 1986, abandoned, which is a continuation of Ser. No. 844,254, Mar. 24, 1986, abandoned, which is a continuation of Ser. No. 537,563, Sep. 30, 1983, abandoned.

[30] Foreign Application Priority Data

Oct. 9, 1982 [JP] Japan ................................ 57-177821

[51] Int. Cl.$^4$ ............................................ B32B 15/14

[52] U.S. Cl. .................................. 428/608; 428/609; 428/612; 428/614; 428/649; 428/652; 428/653; 428/937; 92/222

[58] Field of Search ............... 428/608, 621, 614, 649, 428/632, 627, 652, 653, 937, 615, 609, 612; 123/123 P; 416/241 B; 92/243, 256, 222

[56] References Cited

U.S. PATENT DOCUMENTS

| | | | |
|---|---|---|---|
| 2,317,744 | 4/1943 | Neubent | 428/609 |
| 2,390,343 | 12/1945 | Aske | 428/612 |
| 2,775,493 | 12/1956 | Cheney | 123/193 P |
| 2,793,923 | 5/1957 | Whitfield et al. | 92/222 |
| 3,032,316 | 5/1962 | Kramer | 416/241 B |
| 3,114,612 | 12/1963 | Friedrich | 428/937 |
| 3,295,198 | 1/1967 | Coan | 29/527.4 |
| 3,459,167 | 8/1969 | Briggs et al. | 123/669 |
| 3,784,320 | 1/1974 | Kassmann et al. | 416/215 |
| 3,840,350 | 10/1974 | Tucker, Jr. | 428/627 |
| 4,005,991 | 2/1977 | Vebayasi et al. | 428/612 |
| 4,075,364 | 2/1978 | Panzera | 428/621 |
| 4,141,802 | 2/1979 | Duparque et al. | 428/608 |
| 4,142,022 | 2/1979 | Erickson et al. | 428/432 |
| 4,154,900 | 5/1979 | Kako et al. | 428/609 |
| 4,245,611 | 1/1981 | Mitchell et al. | 123/193 P |
| 4,273,824 | 6/1981 | McThomas et al. | 427/34 |
| 4,318,438 | 3/1982 | Ban et al. | 164/97 |
| 4,372,194 | 2/1983 | Vallaude | 123/193 P |
| 4,739,738 | 4/1988 | Sanden et al. | 123/193 P |

FOREIGN PATENT DOCUMENTS

| | | | |
|---|---|---|---|
| 210140 | 12/1982 | Japan | 123/193 P |
| 58-15743 | 1/1983 | Japan . | |
| 55242 | 4/1983 | Japan | 428/608 |
| 91350 | 5/1983 | Japan | 123/193 P |
| 8301751 | 5/1983 | PCT Int'l Appl. | 428/608 |
| 84/02096 | 6/1984 | PCT Int'l Appl. | 164/98 |

*Primary Examiner*—John J. Zimmerman
*Attorney, Agent, or Firm*—Oblon, Fisher, Spivak, McClelland & Maier

[57] ABSTRACT

Light alloy articles comprising a body of light alloy having a composite layer of heat-resistant fibers and light alloy and bonded to said body, and a surface layer of heat-resisting alloy sprayed onto said composite layer exhibit improved integrity and heat resistance when the heat-resisting alloy is plasma sprayed onto one surface of a preform of fibers and the light alloy is then cast to the opposite surface of the preform such that an interfacial layer is defined between the composite layer and the surface layer in which the fibers and light alloy are integrally incorporated with the heat-resisting alloy.

8 Claims, 1 Drawing Sheet

HEAT RESISTANT LIGHT ALLOY ARTICLES AND METHOD OF MANUFACTURING SAME

This application is a continuation of abandoned Application Ser. No. 087,998 filed Aug. 17, 1987, which in turn is a continuation of abandoned Application Ser. No. 937,457 filed Dec. 2, 1986, which in turn is a continuation of abandoned Application Ser. No. 844,254 filed Mar. 24, 1986 which in turn is a continuation of abandoned Application Ser. No. 537,563 filed Sept. 30, 1983.

BACKGROUND OF THE INVENTION

This invention relates to improved heat-resistant light alloy articles intended for use as internal combustion engine pistons and similar parts, and a method for manufacturing the same.

As is well known in the art, the so-called light alloys such as aluminum alloys and magnesium alloys are characterized by their light weight, but have low heat resistance and poor heat insulation which make it difficult to form such light alloy materials into parts for use in high-temperature environment. To eliminate these shortcomings in order that light alloys may be used in the manufacture of those parts which require heat resistance and insulation as well as light weight, for example, internal combustion engine pistons and combustion chamber-defining cylinder heads, attempts have heretofore been made to provide a light alloy body with a heat resistant and insulating layer on its surface. Such methods are generally classified into the following three types. The first method is by preforming a ceramic material or refractory metal and joining the preform to a piston body of light alloy by mechanical fastening such as bolt fastening and crimping, or by welding. The second method uses insert casting process by which a ceramic material or refractory metal is integrated with a piston body of light alloy. The third method is by coating or treating the surface of a light alloy body by any technique of metallization or spraying, anodization and electrodeposition. However, none of the above-mentioned conventional methods have provided fully successful results. More specifically, light alloy materials such as aluminum and magnesium alloys have an appreciably higher coefficient of thermal expansion than ceramic materials and refractory metals used to form a heat-resistant and heat-insulating surface layer, and this differential thermal expansion causes the surface layer to crack or peel off during thermal cycling, giving rise to a problem in the durability of such articles. Particularly when ceramic materials are used as the heat-resistant and heat-insulating layers in the first and second methods mentioned above, fabricating and processing of ceramic materials are necessary. However, since ceramic materials are generally difficult and expensive to fabricate and process, the overall cost of manufacture is increased. On the other hand, when refractory metals are used as the surface layers, it is difficult to obtain light alloy articles having satisfactory heat insulation because refractory metals themselves are less heat insulative. Moreover, the third method, that is, surface coating or treating method is difficult to form a surface layer having an effective thickness without sacrifice of cost, also failing to achieve satisfactory heat insulation.

Therefore, an object of the present invention which is made in consideration of the above-mentioned circumstances is to provide improved light alloy articles which take advantage of the inherent light weight of light alloys themselves, have excellent heat resistance, heat insulation and durability, and can be produced less costly in high yields. Another object of the present invention is to provide a method for producing such improved light alloy articles.

SUMMARY OF THE INVENTION

According to a first aspect of this invention, there is provided a heat-resistant light alloy article comprising a body of a light alloy, a composite layer formed on and bonded to said body, the composite layer consisting essentially of a light alloy of the same type as the light alloy of which said body is made and heat-resistant fibers having a lower heat conductivity than the light alloy, said fibers being integrally bonded by the light alloy, and a surface layer of a heat-resisting alloy sprayed onto said composite layer, wherein an interfacial layer is defined between said composite layer and said surface layer in which the sprayed heat-resisting alloy of said surface layer is integrally incorporated with the fibers and the light alloy of said composite layer.

According to a second aspect of this invention, the improved heat-resistant light alloy article is produced by the steps of spraying a heat-resisting alloy onto one surface of a preform of heat-resistant fibers, placing the sprayed preform in a mold cavity such that the sprayed layer is in contact with the cavity bottom, pouring a molten light alloy into the mold cavity, and subjecting the molten light alloy in the mold cavity to liquid metal forging, thereby causing the light alloy to fill up spaces amongs the fibers, interstices between the fibers and the sprayed alloy, and voids in the sprayed alloy substantially within the confines of the preform.

BRIEF DESCRIPTION OF THE DRAWINGS

The above and other objects, features and advantages of this invention will be more fully understood from the following description taken in conjunction with the accompanying drawings. It is to be understood, however, that the embodiments are for purpose of illustration only and are not construed as limiting the scope of the invention.

DESCRIPTION OF THE PREFERRED EMBODIMENTS

Figure 1:
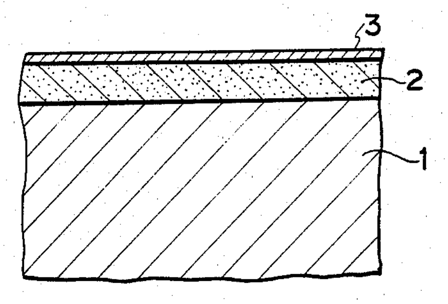
FIG. 1 is a schematic cross-sectional view of one embodiment of the light alloy article according to the invention.
Figure 2:
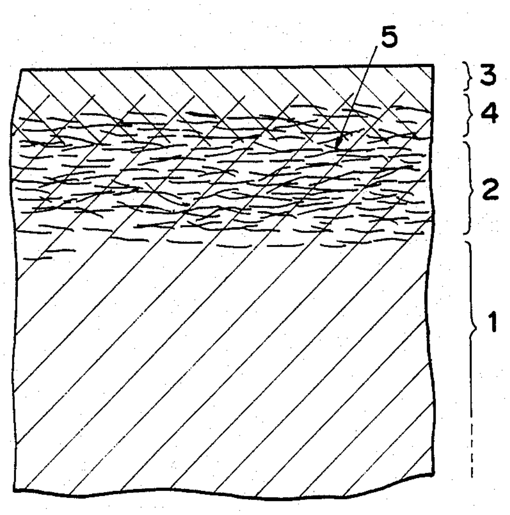
FIG. 2 is an enlarged view of a portion of FIG. 1.

Referring to FIG. 1, one embodiment of the light alloy article according to the invention is shown which comprises a base or body 1 made of a light alloy such as an aluminum or magnesium alloy. On the body 1, a composite fiber/light alloy layer 2 is formed adjacent the surface of the body which is made, in integrated form, of heat-resistant fibers such as inorganic fibers or metallic fibers and a light alloy of the same type as the light alloy of which the body 1 is made. A surface layer 3 of a sprayed heat-resisting alloy is present on the composite layer 2. An interfacial layer 4 is present between the composite layer 2 and the surface layer 3, in which the heat-resisting alloy of the surface layer is integrally and compositely incorporated with the fibers 5 and light alloy of the composite layer as best shown in FIG. 2. Therefore, the interfacial layer 4 constitutes another composite layer. More specifically, the sprayed heat-resisting alloy of the surface layer 3 partially penetrates through the fibers of the composite layer 2 while interstices betweeen the heat-resisting alloy and the fibers and voids in the sprayed alloy itself are filled with the light alloy of the composite layer 2, resulting in the interfacial layer 4 in which the three components are intimately and integrally incorporated into a composite structure.

The body 1 and the layers 2, 3 and 4 will be described in detail. The body 1 may be made of any desired one of well-known light alloys such as aluminum alloys and magnesium alloys as long as it meets the requirements for the body. Since the light alloys used for the body 1 and for the composite layer 2 are of the same type, the light alloy selected may desirably be highly compatible with the fibers used for the composite layer 2.

The composite layer 2 is made of a composite material of heat-resistant fibers such as inorganic fibers and metallic fibers to be described later, and a light alloy of the same type as the light alloy of which the body 1 is made, the fibers being integrally and firmly bonded by the light alloy. The fibers selected should have a lower coefficient of thermal expansion and a lower heat conductivity than the light alloy. Fibers having a lower coefficient of thermal exansion than the light alloy may be selected for the composite layer 2 such that the overall coefficient of thermal expansion of the composite layer 2 is lower than that of the light alloy body 1 and approximate or equal to that of the surface layer 3 of sprayed heat-resisting alloy. It is to be noted that the sprayed heat-resisting alloy layer 3 has a substantially lower coefficient of thermal expansion than the light alloy body 1. For example, aluminum and magnesium alloys have a coefficient of thermal expansion of $20\text{–}23\times10^{-6}$/deg. and $20\text{–}26\times10^{-6}$/deg., respectively, while the sprayed heat-resisting alloy layer 3 generally has a coefficient of thermal expansion of the order of $12\text{–}18\times10^{-6}$/deg. If the surface layer of heat-resisting alloy is directly sprayed to the light alloy body, the expansion and contraction of the light alloy body due to thermal cycling during the service of the subject article would cause the sprayed layer to crack or peel off. By interposing the composite layer 2 between the body 1 and the sprayed heat-resisting alloy layer 3, and by using in the composite layer 2 fibers having a lower coefficient of thermal expansion than the light alloy of the body 1 so that the overall coefficient of thermal expansion of the composite layer 2 is approximate or equal to that of the sprayed heat-resisting alloy layer 3, such cracking and peeling-off of the sprayed heat-resisting alloy layer 3 can be precluded. Since the body 1 and the composite layer 2 are continuously and integrally connected due to the use of light alloy of the same type for both the body and the composite layer, there is no possibility that the composite layer might be separated from the body. The reinforcement of the composite layer 2 with fibers minimizes or eliminates the occurrence of cracks. When the fibers having a lower heat conductivity than the light alloy of the body 1 are used for the composite layer 2, the overall heat conductivity of the composite layer 2 is lower than that of the light alloy body 1 so that the composite layer 2 functions as a heat-insulating layer for the light alloy body 1 to prevent the body 1 from softening and deteriorating at elevated temperatures. In order that the intermediate composite layer 2 may fully exert its effect of heat insulation, the composite layer 2 may desirably have an increased thickness. Since the layer 2 is a composite consisting of fibers and light alloy, the thickness of the composite layer may be easily controlled and increased to a considerable extent as will be fully explained with respect to its fabrication.

The heat-resistant fibers used for the composite layer 2 may desirably be selected from inorganic long fibers of alumina ($Al_2O_3$), alumina-silica ($Al_2O_3$—$SiO_2$), silicon carbide (SiC), etc. and short fibers milled therefrom, metallic long fibers of tungsten, stainless steel, etc. and short fibers milled therefrom, and whiskers of alumina ($Al_2O_3$), silicon carbide (SiC), silicon nitride ($Si_3N_4$), potassium titanate ($K_2Ti_6O_{13}$), etc. To enhance the compatibility or bonding of fibers with the light alloy, the fibers may be pretreated with a suitable material highly wettable by the molten light alloy or with the light alloy itself.

The proportion of fibers blended in the composite layer is not particularly limited, but may preferably be in the range of about 2 to 50% by volume based on the total volume of the composite layer. At least about 2% by volume of fibers is necessary to provide the desired heat insulation and reduced coefficient of thermal expansion whereas it is difficult to integrally bind more than 50% by volume of fibers with the light alloy into a composite material. The thickness of the composite layer 2 may preferably range from about 2 mm to about 30 mm although the exact thickness varies with the particular application of articles. Sufficient heat insulation is not achievable when the composite layer is less than 2 mm thick. The composite layer may desirably be as thick as possible for achieving good heat insulation although thicknesses exceeding 30 mm only increase the cost without an additional benefit.

In order that coefficient of thermal expansion may vary more progressively between the light alloy body 1 and the surface layer 3 of sprayed heat-resisting alloy, the concentrations of the fibers in the composite layer 2 may be increased from its boundary with the light alloy body 1 toward the surface layer 3. In this case, the concentration of the fibers may vary either continuously or stepwise.

The surface layer 3 of heat-resisting alloy sprayed on the composite layer 2 serves to improve the heat-resistance and corrosion-resistance of the article by covering the surface of the composite layer. Therefore, the heat-resisting alloy used for the surface layer 3 should be heat and corrosion resistant and have improved intimacy with the composite layer. Examples of the heat-resisting alloys include stainless steels such as 18-8 stainless steel; Ni-Cr alloys consisting essentially of 10–40% Cr and the balance of Ni; Ni-Al alloys consisting essentially of 3–20% Al and the balance of Ni; Ni-Cr-Al alloys consisting essentially of 10–40% Cr, 2–10% Al and the balance of Ni; and No-Cr-Al-Y alloys consisting essentially of 10–40% Cr, 2–10% Al. 0.1–1% Y and the balance of Ni, but not limited thereto. These alloys have a coefficient of thermal expansion of about 12 to $18\times10^{-6}$/deg.

The surface layer 3 of sprayed heat-resisting alloy may preferably have a thickness ranging from 10 μm to 5 mm. Thicknesses of less than 10 μm often fail to provide sufficient heat resistance while thicknesses exceeding 5 mm are time-consuming to reach by spraying, resulting in low productivity.

In the interfacial layer 4 between the composite layer 2 and the surface layer 3, the heat-resisting alloy of the surface layer 3 is penetrated into spaces among fibers, and interstices between the fibers and the sprayed alloy and voids in the sprayed alloy are filled with the cast light alloy of the composite layer so that the sprayed heat-resisting alloy is integrally incorporated with the fibers and light alloy into a composite structure. The bond strength between the composite layer 2 and the surface layer 3 is assured very high by this interfacial layer 4, preventing the surface layer 3 from cracking or peeling off.

To obtain the interfacial layer 4 in the form of a composite layer consisting of heat-resisting alloy, fibers, and light alloy, as will be described with reference to the method of manufacture, the heat-resisting alloy is sprayed onto one surface of a preform of fibers to form the surface layer 3 and to cause part of the heat-resisting alloy to penetrate into a surface portion of the fiber preform, and thereafter, the fiber preform is impregnated with a molten light alloy from the opposite surface. When the heat-resisting alloy has been sprayed onto the fiber preform, generally, there are numerous microscopic voids in the sprayed alloy and spaces among fibers are only partially filled with the sprayed metal to leave interstices therebetween. During the subsequent step of impregnating the light alloy, the voids and interstices in the interfacial area where fibers are bound by the sprayed alloy are filled with the light alloy. As a result, this interfacial area becomes a composite layer in which the heat-resisting alloy is integrally incorporated with the fibers and light alloy.

The light alloy articles as herein disclosed may be manufactured by a variety of methods. The method according to the second aspect of the present invention which is the best among them is described below.

At the outset, heat-resistant inorganic or metallic fibers are shaped into a preform having substantially the same shape and size of the composite layer of the final product. A heat-resisting alloy is sprayed onto one surface of this fiber preform. As a result, the sprayed heat-resisting alloy forms a surface layer on the fiber preform and partially penetrates into a surface portion of the preform. Then, the sprayed preform is placed in a mold cavity which is substantially configured and sized to the configuration and size of the final product, so that the sprayed layer is in contact with the bottom of the mold cavity. In this condition, a molten light alloy, for example, molten aluminum or magnesium alloy is poured into the mold cavity. Liquid metal forging is effected by applying a high pressure of about 500 to 1500 kg/cm$^2$ to the molten metal in the mold cavity. Under the pressure applied, spaces among fibers in the fiber preform, interstices in the interfacial area where fibers ar bound with the sprayed alloy, and voids in the sprayed alloy in the interfacial area are filled with the molten light alloy. Upon removal from the mold after solidification, there is obtained a light alloy block which has a composite layer consisting of fibers bound with the light alloy and a surface layer of heat-resisting alloy at the given positions beneath and at the top. An interfacial layer exists between the composite layer and the surface layer in which the components of both the layers are integrally combined and incorporated. That is, the light alloy article has a body of cast light alloy, a composite fiber/light alloy layer which is continuously and integrally bonded to the body, and a surface layer of sprayed heat-resisting alloy which forms an interfacial layer of composite structure with the composite layer. The pressure applied to the molten metal for liquid metal forging is continued until the cast light alloy has solidifed. The heat-resisting alloy may be sprayed by a variety of spraying processes including gas, arc and plasma spray processes, although the plasma spray process can produce deposits with the maximum strength and the best performance.

The above-described method is very advantageous in that the light alloy body and the composite fiber/light alloy layer can be integrally formed and the light alloy constituting the body is continuous to the light alloy constituting the composite layer so that the maximum strength of bond is established between the composite layer and the body, and that the interfacial layer between the composite layer and the surface layer also constitutes a composite structure integral with and continuous to both the composite layer and the surface layer so that the maximum strength of bond is also established between the composite layer and the surface layer. The integral casting has an additional advantage of reducing the number of production steps. Further, the thickness of the composite layer may be controlled simply by changing the thickness of the starting fiber preform. The composite layer can be readily formed to a sufficient thickness to act as a heat insulation or as a buffer for thermal expansion and contraction.

Examples of the invention are presented below by way of illustration and not by way of limitation.

EXAMPLE 1

The invention was applied to a heat-resistant piston having an outer diameter of 90 mm for use in a four-cylinder Diesel engine having a displacement of 2,200 cc.

Figure 3:
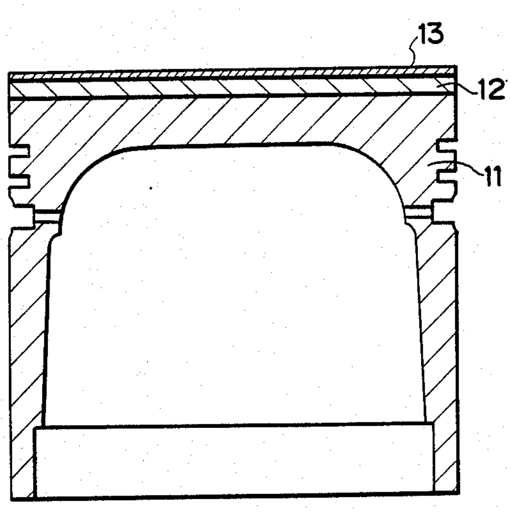
FIG. 3 is a cross section showing another embodiment of the invention as applied to an internal combustion engine piston, when taken along the axis of the piston.

Potassium titanate whiskers having a low heat conductivity and a low coefficient of thermal expansion were chosen as the heat-resistant fibers. To potassium titanate whiskers having an average fiber diameter of 0.3 μm and an average fiber length of 20 μm (manufactured and sold by Otsuka Chemicals K.K., Japan, under trade name "Tismo") was added a 15% colloidal silica solution as a binder. The mixture was compression molded into a disc-like fiber preform having a diameter of 90 mm and a thickness of 5 mm. Powder of 18-8 stainless steel was plasma sprayed onto one surface of the preform to form a surface layer of 1.2 mm thick. The sprayed preform was pre-heated to a temperature of about 800° C. and placed in a head-defining lower mold-half of a high-pressure liquid-metal-forging mold which was configured and sized to the desired piston, such that the surface layer of sprayed steel was in contact with the head-defining bottom of the mold cavity. A molten metal, i.e., an aluminum alloy identified as JIS AC 8A at 730° C. was poured into the mold cavity, and liquid metal forging was effected by applying a pressure of 1000 kg/cm$^2$ and continuing pressure application until the cast metal had completely solidified. After removal from the mold, the block was heat treated by $T_6$ treatment and then machined into the desired piston. The thus obtained piston is shown in the cross-sectional view of FIG. 3. The piston comprises, as shown in FIG. 3, a piston body 11 of aluminum alloy, a composite layer 12 consisting of a potassium titanate whisker/aluminum alloy composite material, and a surface layer 13 of sprayed stainless steel. The proportion of fibers (potassium titanate whiskers) incorporated in the composite layer was 15% by volume.

Microscopic observation on a cross section of the piston manufactured by the procedure of Example 1 revealed that in the interfacial layer between the surface layer and the composite layer, the sprayed 18-8 stainless steel partially penetrated through fibers while interstices between the fibers and such penetrating steel and voids in the sprayed steel was filled with aluminum alloy. In this piston, the composite fiber/light alloy layer and the surface layer of sprayed 18-8 stainless steel had substantially the same coefficient of thermal expansion of about $18\times10^{-6}$/deg. It is thus apparent that the surface (sprayed stainless steel) layer is not liable to peeling or cracking during thermal cycling. Since the potassium titanate whiskers used in the composite layer have a low heat conducitivity of about 0.013 cal./cm-.sec.deg. at 25° C., the composite layer of such whiskers is also effective for heat insulation. Using such pistons in a Diesel engine, an actual durability test was carried out to find that cracking and separation did not occur in the surface layer and the piston did not melt down.

EXAMPLE 2

A 10% colloidal alumina solution was added to short fibers of silica-alumina having an average fiber diameter of 2.8 μm and a fiber length of 1 to 60 mm and the mixture was molded into a disc-like fiber preform having a diameter of 30 mm and a thickness of 10 mm by vacuum filtration molding. A heat-resisting alloy, namely a 75% Ni-19% Cr-6% Al alloy was plasma sprayed onto one surface of the preform to a thickness of 1.2 mm. The sprayed preform was placed in a mold cavity such that the sprayed layer was in contact with the bottom of the mold cavity. An aluminum alloy identified as JIS AC 8A was then poured at about 740° C. into the mold cavity. Liquid metal forging was effected by applying a pressure of 1000 kg/cm$^2$ to the molten alloy and continuing pressure application until the molten alloy had completely solidifed. Upon removal from the mold after solidifcation, there was obtained a light alloy block having a composite layer of silica-alumina fiber/aluminum alloy and a surface layer of sprayed Ni-Cr-Al alloy. The fibers occupied 10% by volume of the composite layer in the block.

The overall heat conductivity of the overcoat consisting of the sprayed heat-resisting alloy and the fiber/-light alloy composite material on the light alloy block manufactured by the procedure of Example 2 was found to be 0.20 cal/cm.sec. deg. while the aluminum alloy (JIS AC 8A) had a heat conductivity of 0.34 cal/cm.sec.deg. This indicates that the light alloy block of Example 2 is improved in heat insulation at its surface portion. Miroscopic observation of the light alloy block of Example 2 also demonstrated that the interfacial layer of composite structure existed between the surface layer and the composite layer.

Although an aluminum alloy as used as the light alloy for the body and the composite layer in the foregoing examples, it is apparent that similar results are obtained by using magnesium alloys because magnesium and aluminum alloys have similar coefficients of thermal expansion and heat conductivities.

Although the present invention is applied to pistons in the foregoing examples, the light alloy articles and the method of manufacture according to the invention are equally applicable to cylinder head combustion ports, turbocharger casings and the like.

It will be understood that the light alloy article according to the invention may be used in other applications by attaching it to a given portion of another article by any sitable joining technique including welding, brazing and insert casting.

As understood from the foregoing, the light alloy article according to the invention comprises a composite layer between a body of light alloy and a surface layer of sprayed heat-resisting alloy which consists of the light alloy and fibers having lower coefficient of thermal expansion and heat conductivity than the light alloy and integrally bound with the light alloy so that the overall coefficient of thermal expansion of the composite layer may become approximate or equal to that ot the surface layer by properly selecting the volume percentage of the fibers in the composite layer. In addition, the components of both the composite layer and the surface layer of sprayed heat-resisting alloy are integrally incorporated in the interfacial layer between the composite layer and the surface layer to provide an appreciably increased strength of bond between these layers so that occurrence of cracks and peel of the surface layer due to differential thermal expansion is fully prevented. In addition, as the overall heat conductivity of the composite layer is lower than that of the light alloy itself, improved heat insulation to the light alloy body is achieved. When used in a high-temperature environment or subjected to severe thermal cycling, such an article can operate for an extended period of time and maintain its heat resistance without melting-down or deterioration in the body.

The method of the invention can produce the light alloy article with the above-mentioned advantages in a relatively simple and easy manner through a reduced number of steps. The composite fiber/light alloy layer can be easily formed to a sufficient thickness to act as a heat insulation layer.

What is claimed is:

1. A heat-resistant light alloy article comprising
a body of a light alloy,
a composite layer formed on and integrated with said body, the composite layer consisting essentially of a light alloy of the same type as the light alloy of which said body is made and heat-resistant fibers having a lower coefficient of thermal expansion and a lower heat conductivity than the light alloy, said fibers being integrally bonded by the light alloy, and
a surface layer of a heat-resisting alloy sprayed onto said composite layer,
wherein an interfacial layer is defined between said composite layer and said surface layer in which the sprayed heat-resisting alloy of said surface layer is integrally incorporated with the fibers and the light alloy of said composite layer.

2. The article according to claim 1 wherein said light alloy is selected from the group consisting of aluminum alloys and magnesium alloys.

3. The article according to claim 1 wherein said fiber is selected from the group consisting of fibers of alumina, silica-alumina and silicon carbide, fibers of tungsten and stainless steel, and whiskers of alumina, silicon carbide, silicon nitride and potassium titanate.

4. The article according to claim 1 wherein said heat-resisting alloy is selected from the group consisting of stainless steel, Ni-Cr alloy, Ni-Al alloy, Ni-Cr-Al alloy, and Ni-Cr-Al-Y alloy.

5. The article according to claim 1 wherein said composite layer is 2 mm to 30 mm thick.

6. The article according to claim 1 wherein said surface layer is 10 μm to 5 mm thick.

7. The article according to claim 1 wherein the concentration of fibers in said composite layer increases continuously from its boundary with the body toward the surface layer.

8. The article according to claim 1 wherein the concentration of fibers in said composite layer increases stepwise from its boundary with the body toward the surface layer.

* * * * *